(12) United States Patent
Jin et al.

(10) Patent No.: US 11,475,495 B2
(45) Date of Patent: Oct. 18, 2022

(54) INFORMATION PROCESSING DEVICE, PROGRAM AND INFORMATION PROCESSING METHOD

(71) Applicant: TOYOTA JIDOSHA KABUSHIKI KAISHA, Toyota (JP)

(72) Inventors: Xin Jin, Nagoya (JP); Takayuki Murase, Toyota (JP); Tadahiro Kashiwai, Nagoya (JP); Toru Takashima, Susono (JP); Hiroaki Hanzawa, Toyota (JP); Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/218,803

(22) Filed: Mar. 31, 2021

(65) Prior Publication Data
US 2021/0319488 A1 Oct. 14, 2021

(30) Foreign Application Priority Data

Apr. 8, 2020 (JP) .............................. JP2020-069984

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0611* (2013.01); *G06Q 30/0205* (2013.01); *G06Q 30/0206* (2013.01)

(58) Field of Classification Search
CPC ........... G06Q 30/0611; G06Q 30/0205; G06Q 30/0206
See application file for complete search history.

(56) References Cited

U.S. PATENT DOCUMENTS

2017/0372235 A1* 12/2017 Dayama ................. G06Q 10/06
2019/0051174 A1* 2/2019 Haque .................... G06Q 50/30
2020/0167811 A1* 5/2020 Aggarwal .......... G06Q 30/0202

FOREIGN PATENT DOCUMENTS

JP 2018-077592 A 5/2018

OTHER PUBLICATIONS

Paundra, Joshua, et al. "Preferences for car sharing services: Effects of instrumental attributes and psychological ownership." Journal of environmental psychology 53 (2017): 121-130.*
Huo, Xiang, et al. "The allocation problem of electric car-sharing system: A data-driven approach." Transportation Research Part D: Transport and Environment 78 (2020): 102192.*

* cited by examiner

*Primary Examiner* — Kathleen Palavecino
(74) *Attorney, Agent, or Firm* — Sughrue Mion, PLLC

(57) ABSTRACT

An information processing device calculates a quoted price to be presented to a purchase contemplation person for a vehicle. The information processing device includes a control unit that calculates a demand forecast when the purchase contemplation person uses the vehicle as a car-sharing vehicle, calculates an expected income when the purchase contemplation person uses the vehicle as the car-sharing vehicle, based on the demand forecast, and calculates the quoted price based on a vehicle price of the vehicle and the expected income, to present the quoted price to the purchase contemplation person.

20 Claims, 6 Drawing Sheets

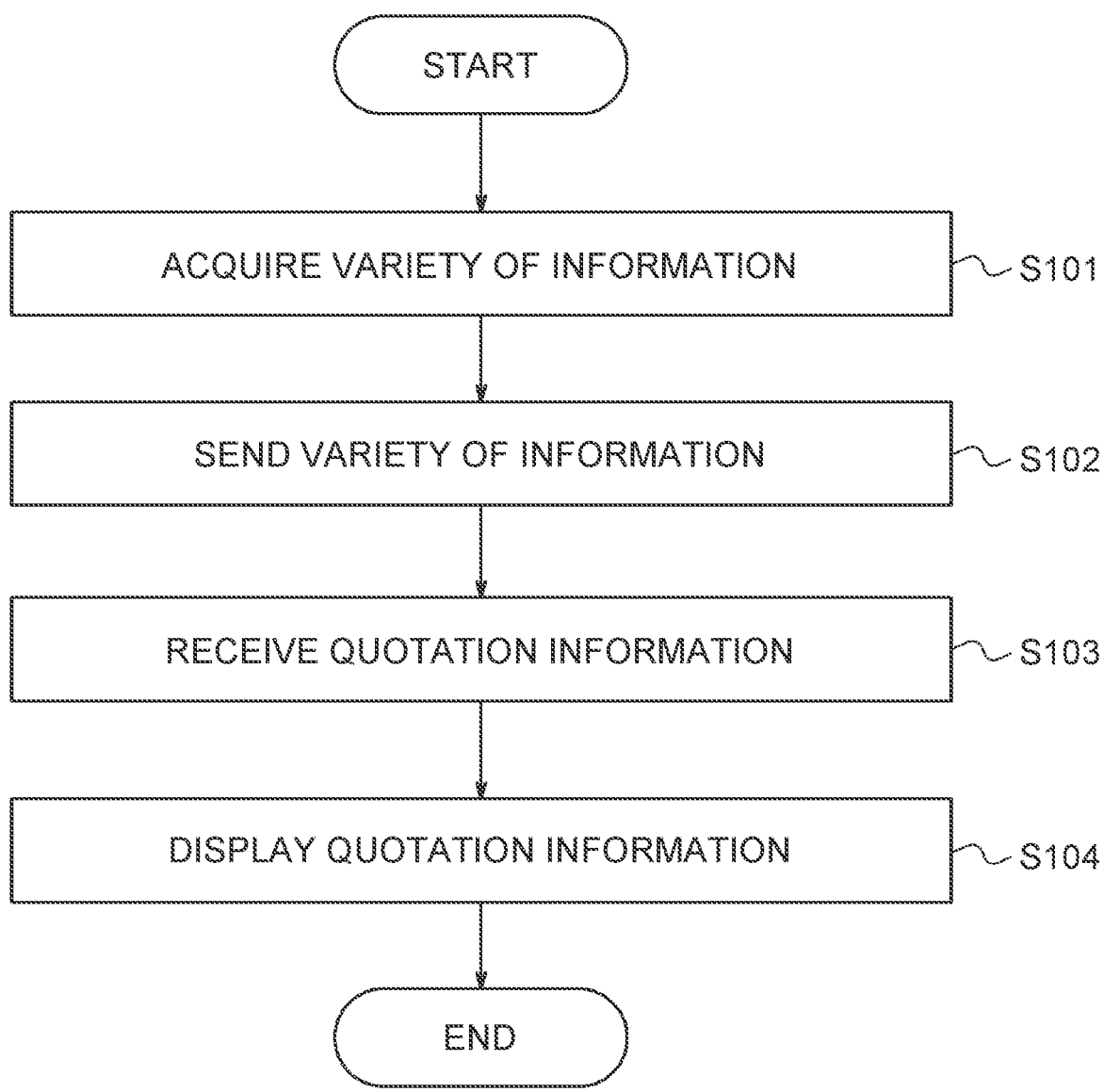

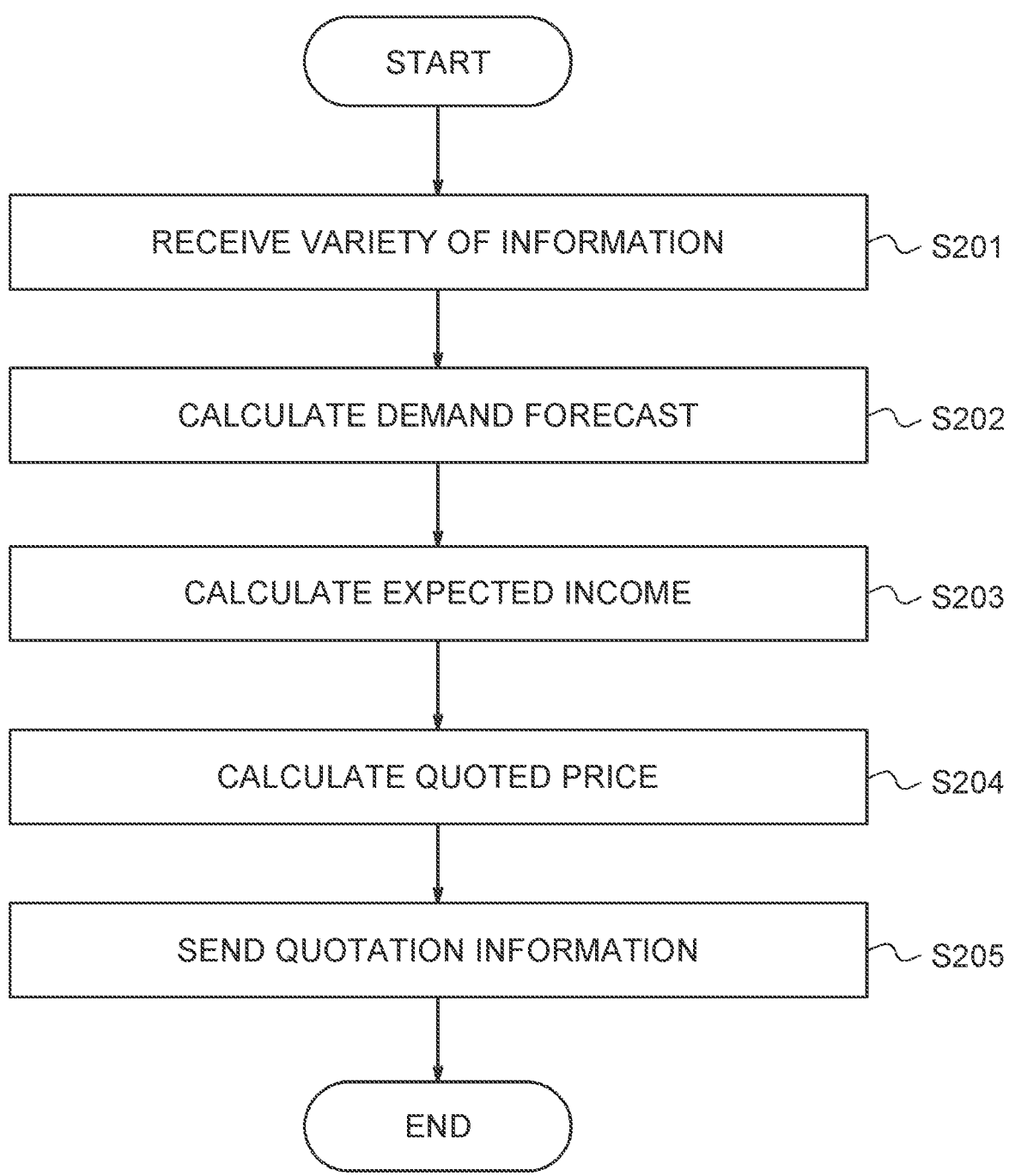

INFORMATION PROCESSING DEVICE, PROGRAM AND INFORMATION PROCESSING METHOD

INCORPORATION BY REFERENCE

The disclosure of Japanese Patent Application No. 2020-069984 filed on Apr. 8, 2020 including the specification, drawings and abstract is incorporated herein by reference in its entirety.

BACKGROUND

1. Technical Field

The disclosure relates to an information processing device, a program and an information processing method.

2. Description of Related Art

Conventionally, there has been known a technology of giving such a proposal that the purchase price of a vehicle such as an automobile is ostensibly low, for increasing the buying motivation of a purchase contemplation person who contemplates the purchase of the vehicle.

For example, in a technology disclosed in Japanese Unexamined Patent Application Publication No. 2018-77592, from the vehicle price of a vehicle for which the purchase is contemplated, a lending income when the vehicle is lent is subtracted, and the resulting price is presented to the purchase contemplation person.

SUMMARY

At the time of giving such a proposal that the purchase price of the vehicle is ostensibly low, it is desirable to present a quoted price based on an accurate forecast.

An object of the disclosure is to present such a quoted price that the purchase price of the vehicle is ostensibly low, based on an accurate forecast.

An information processing device according to the disclosure is an information processing device that calculates a quoted price to be presented to a purchase contemplation person for a vehicle, the information processing device including a control unit that: calculates a demand forecast when the purchase contemplation person uses the vehicle as a car-sharing vehicle; calculates an expected income when the purchase contemplation person uses the vehicle as the car-sharing vehicle, based on the demand forecast; and calculates the quoted price based on a vehicle price of the vehicle and the expected income, to present the quoted price to the purchase contemplation person.

A program according to the disclosure is a program that calculates a quoted price to be presented to a purchase contemplation person for a vehicle, the program causing a computer to execute a behavior including: calculating a demand forecast when the purchase contemplation person uses the vehicle as a car-sharing vehicle; calculating an expected income when the purchase contemplation person uses the vehicle as the car-sharing vehicle, based on the demand forecast; and calculating the quoted price based on a vehicle price of the vehicle and the expected income, to present the quoted price to the purchase contemplation person.

An information processing method according to the disclosure is an information processing method in an information processing device that calculates a quoted price to be presented to a purchase contemplation person for a vehicle, the information processing method including: calculating a demand forecast when the purchase contemplation person uses the vehicle as a car-sharing vehicle; calculating an expected income when the purchase contemplation person uses the vehicle as the car-sharing vehicle, based on the demand forecast; and calculating the quoted price based on a vehicle price of the vehicle and the expected income, to present the quoted price to the purchase contemplation person.

With the disclosure, it is possible to present such a quoted price that the purchase price of the vehicle is ostensibly low, based on an accurate forecast.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a flowchart showing a behavior of the information processing system according to the embodiment of the disclosure; and FIG. 6 is a flowchart showing a behavior of the information processing system according to the embodiment of the disclosure.

DETAILED DESCRIPTION OF EMBODIMENTS

Hereinafter, an embodiment of the disclosure will be described with reference to the drawings.

Figure 1:
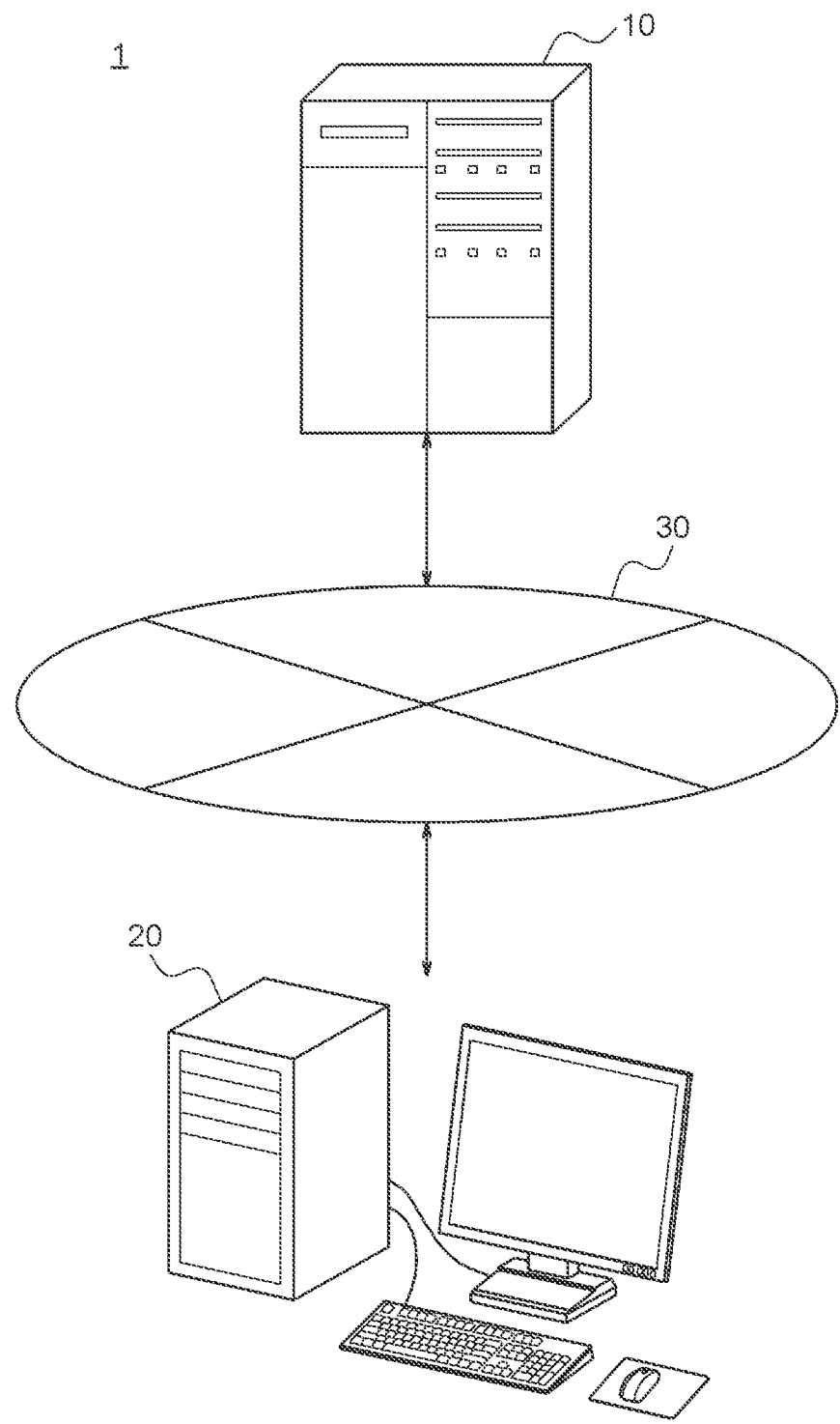
FIG. 1 is a diagram showing the configuration of an information processing system according to an embodiment of the disclosure.

FIG. 1 is a diagram showing the configuration of an information processing system 1 according to an embodiment of the disclosure. The configuration and outline of the information processing system 1 according to the embodiment of the disclosure will be described with reference to FIG. 1.

The information processing system 1 includes an information processing device 10 and a terminal device 20. The information processing device 10 and the terminal device 20 are connected so as to communicate with each other through a network 30. The network 30 may be a network such as the internet and a mobile communication network.

FIG. 1 shows the one information processing device 10 and the one terminal device 20, but the number of information processing devices 10 and the number of terminal devices 20 may be two or more.

For example, the information processing device 10 is a dedicated computer configured to function as a server. The information processing device 10 may be a general-purpose personal computer (PC).

The information processing device 10 can communicate with the terminal device 20 through the network 30. From the terminal device 20, the information processing device 10 receives a variety of information relevant to a vehicle for which purchase is contemplated by a purchase contemplation person who contemplates the purchase of the vehicle, and a variety of information relevant to the purchase contemplation person. Hereinafter, the vehicle for which the purchase is contemplated by the purchase contemplation person who contemplates the purchase of the vehicle is referred to as merely "purchase contemplation vehicle" also. The purchase contemplation vehicle is an arbitrary kind of automobile such as a gasoline vehicle, a diesel vehicle, a hybrid vehicle (HV), a plug-in hybrid vehicle (PHV), an electric vehicle (EV) or a fuel cell vehicle (FCV), for example.

The information processing device 10 calculates a quoted price of the purchase contemplation vehicle that is presented to the purchase contemplation person, based on a variety of information that is relevant to the purchase contemplation vehicle and the purchase contemplation person and that is received from the terminal device 20, and other information.

The information processing device 10 calculates a demand forecast when the purchase contemplation person uses the purchase contemplation vehicle as a car-sharing vehicle, based on a variety of information that is relevant to the purchase contemplation vehicle and the purchase contemplation person and that is received from the terminal device 20, and other information. The use of the purchase contemplation vehicle as the car-sharing vehicle means that the purchase contemplation person lends the purchase contemplation vehicle to another person as a car-sharing vehicle in a period of time during which the purchase contemplation person does not use the purchase contemplation vehicle, after the purchase contemplation person purchases the purchase contemplation vehicle. The information processing device 10 calculates an expected income when the purchase contemplation person uses the purchase contemplation vehicle as the car-sharing vehicle, based on the calculated demand forecast. The information processing device 10 calculates the quoted price of the purchase contemplation vehicle by subtracting the calculated expected income from the vehicle price of the purchase contemplation vehicle. In this way, in the description, the "quoted price" is not the vehicle price itself but a price resulting from subtracting the expected income that is likely to be obtained when the purchase contemplation person uses the purchase contemplation vehicle as the car-sharing vehicle, from the vehicle price. That is, the quoted price is a money amount that is assumed to be substantially paid when the purchase contemplation person purchases the purchase contemplation vehicle.

The terminal device 20 is installed at a vehicle dealer or the like. The terminal device 20 may be a dedicated terminal device that is used in the information processing system 1, or may be a general-purpose terminal device. In the case of the general-purpose terminal device, examples of the terminal device 20 include a desktop PC, a notebook PC, a tablet computer and a smartphone.

The terminal device 20 receives the quoted price of the purchase contemplation vehicle from the information processing device 10. The terminal device 20 can present, to the purchase contemplation person, the quoted price of the purchase contemplation vehicle that is received from the information processing device 10. The terminal device 20 may be operated, for example, by a sales staff who works at the vehicle dealer, or may be operated by the purchase contemplation person.

Figure 2:
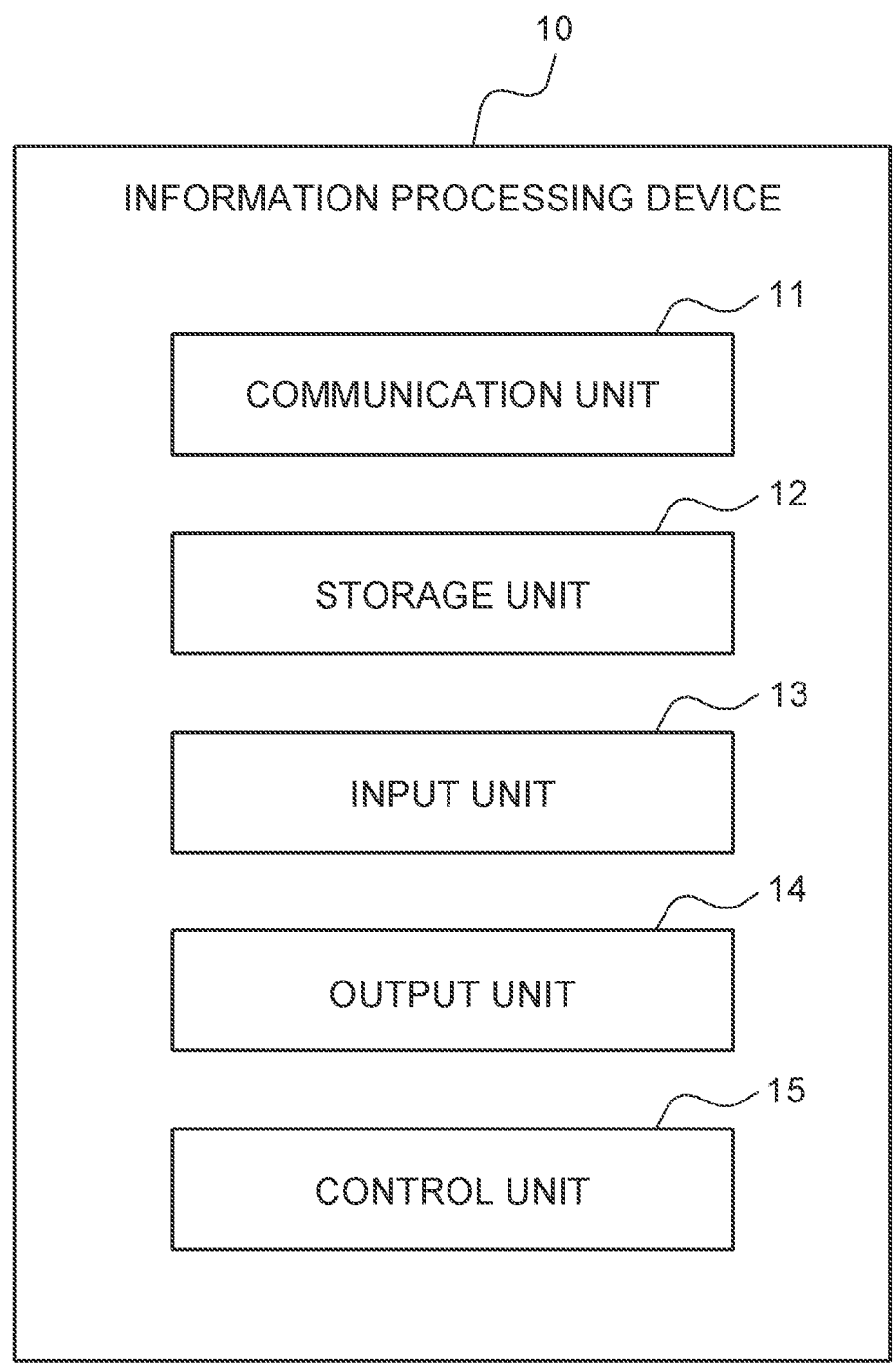
FIG. 2 is a block diagram showing the configuration of an information processing device according to the embodiment of the disclosure.

The configuration of the information processing device 10 according to the embodiment of the disclosure will be described with reference to FIG. 2.

The information processing device 10 includes a communication unit 11, a storage unit 12, an input unit 13, an output unit 14 and a control unit 15.

The communication unit 11 includes a communication module that is connected to the network 30. For example, the communication unit 11 may include a communication module for a local area network (LAN). In the embodiment, the information processing device 10 is connected to the network 30 through the communication unit 11. The communication unit 11 sends and receives multiple kinds of information through the network 30. The communication unit 11 can communicate with the terminal device 20 through the network 30.

The storage unit 12 is a semiconductor memory, a magnetic memory or an optical memory, for example, but is not limited to them. The storage unit 12 may function as a main storage device, an auxiliary storage device or a cache memory, for example. The storage unit 12 stores arbitrary kinds of information that are used for a behavior of the information processing device 10. For example, the storage unit 12 may store a system program, an application program, a variety of information received by the communication unit 11, and the like. The information stored in the storage unit 12 may be updated using the information received from the network 30 through the communication unit 11, for example. A part of the storage unit 12 may be installed in the exterior of the information processing device 10. In that case, the part of the storage unit 12 that is installed in the exterior may be connected to the information processing device 10 through an arbitrary interface.

The input unit 13 includes one or more input interfaces that detect a user input and acquire input information based on an operation by a user. Examples of the input unit 13 include a physical key, a static capacitance key, a touch screen provided integrally with a display monitor of the output unit 14, and a microphone that accepts a voice input, but are not limited to them.

The output unit 14 includes one or more output interfaces that output information and give notice to the user. Examples of the output unit 14 include a display monitor that outputs information as a picture and a speaker that outputs information as a voice, but are not limited to them.

The control unit 15 includes at least one processor, at least one dedicated circuit, or a combination of a processor and a dedicated circuit. The processor is a general-purpose processor such as a central processing unit (CPU) or a graphics processing unit (GPU), or a dedicated processor for a particular process. For example, the dedicated circuit is a field-programmable gate array (FPGA) or an application specific integrated circuit (ASIC). The control unit 15 executes processes about the behavior of the information processing device 10, while controlling each unit of the information processing device 10.

Figure 3:
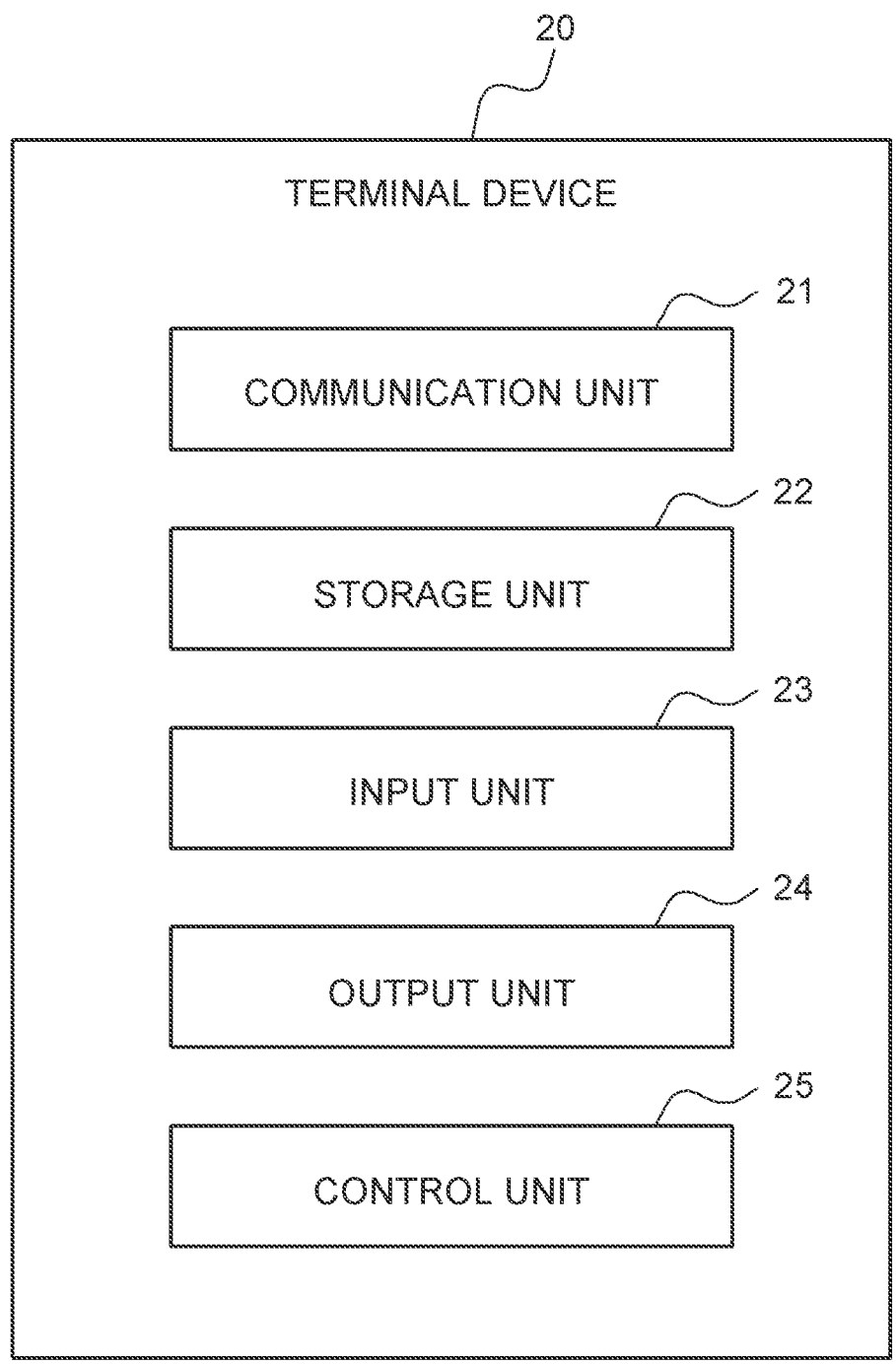
FIG. 3 is a block diagram showing the configuration of a terminal device according to the embodiment of the disclosure.

The configuration of the terminal device 20 according to the embodiment of the disclosure will be described with reference to FIG. 3.

The terminal device 20 includes a communication unit 21, a storage unit 22, an input unit 23, an output unit 24 and a control unit 25.

The communication unit 21 includes a communication module that is connected to the network 30. For example, the communication unit 21 may include a communication module for a LAN. In the embodiment, the terminal device 20 is connected to the network 30 through the communication unit 21. The communication unit 21 sends and receives multiple kinds of information through the network 30. The communication unit 21 can communicate with the information processing device 10 through the network 30.

The storage unit 22 is a semiconductor memory, a magnetic memory or an optical memory, for example, but is not limited to them. The storage unit 22 may function as a main storage device, an auxiliary storage device or a cache memory, for example. The storage unit 22 stores arbitrary kinds of information that are used for a behavior of the terminal device 20. For example, the storage unit 22 may store a system program, an application program, a variety of information received by the communication unit 21, and the like. The information stored in the storage unit 22 may be updated using the information received from the network 30 through the communication unit 21, for example. A part of the storage unit 22 may be installed in the exterior of the terminal device 20. In that case, the part of the storage unit 22 that is installed in the exterior may be connected to the terminal device 20 through an arbitrary interface.

The input unit 23 includes one or more input interfaces that detect a user input and acquire input information based on an operation by the user. Examples of the input unit 23 include a physical key, a static capacitance key, a touch screen provided integrally with a display monitor of the output unit 24, and a microphone that accepts a voice input, but are not limited to them.

The output unit 24 includes one or more output interfaces that output information and give notice to the user. Examples of the output unit 24 include a display monitor that outputs information as a picture, a printer that prints information on paper, and a speaker that outputs information as a voice, but are not limited to them.

The control unit 25 includes at least one processor, at least one dedicated circuit, or a combination of a processor and a dedicated circuit. The processor is a general-purpose processor such as a CPU or a GPU, or a dedicated processor for a particular process. For example, the dedicated circuit is a FPGA or an ASIC. The control unit 25 executes processes about the behavior of the terminal device 20, while controlling each unit of the terminal device 20.

Behavior of Information Processing System

A behavior of the information processing system 1 shown in FIG. 1 will be described with reference to FIG. 2 and FIG. 3.

The input unit 23 of the terminal device 20 acquires a variety of information relevant to the purchase contemplation vehicle and the purchase contemplation person, based on an input operation by the sales staff, the purchase contemplation person or the like.

Examples of the variety of information relevant to the purchase contemplation vehicle and the purchase contemplation person include the vehicle model of the purchase contemplation vehicle, an option that is contemplated to be equipped in the purchase contemplation vehicle, a life pattern of the purchase contemplation person, the address of the purchase contemplation person, a per-time price when the purchase contemplation person lends the purchase contemplation vehicle, and a planned use year-number for the purchase contemplation vehicle.

The "life pattern" is information based on the life pattern of the purchase contemplation person. Specifically, for example, in the case where the purchase contemplation person lends the purchase contemplation vehicle as the car-sharing vehicle, the "life pattern" is information indicating a day of week and a period of time during which the purchase contemplation person can use the purchase contemplation vehicle as the car-sharing vehicle. For example, in the case where the purchase contemplation person is a company employee who works Monday to Friday and does not plan to use the purchase contemplation vehicle between 7:00 a.m. and 6:00 p.m. Monday to Friday, the "life pattern" includes information indicating that the purchase contemplation person can lend the purchase contemplation vehicle as the car-sharing vehicle between 7:00 a.m. and 6:00 p.m. Monday to Friday.

The "address" is the address of the purchase contemplation person. In the case where the address of a parking space where the purchase contemplation person plans to park the purchase contemplation vehicle is different from the address of the purchase contemplation person, the "address" may be the address of the parking space where the purchase contemplation person plans to park the purchase contemplation vehicle.

The "per-time price" is a lending price per unit time that is assumed when the purchase contemplation person lends the purchase contemplation vehicle as the car-sharing vehicle. The unit time may be an arbitrary time, and for example, may be an hour. In this case, the per-time price is a lending price per hour.

The "planned use year-number" is the number of years during which the purchase contemplation person plans to use the purchase contemplation vehicle. That is, the "planned use year-number" is the number of years that the purchase contemplation person assumes as the number of years from the purchase of the purchase contemplation vehicle to the sale of the purchase contemplation vehicle.

Figure 4:
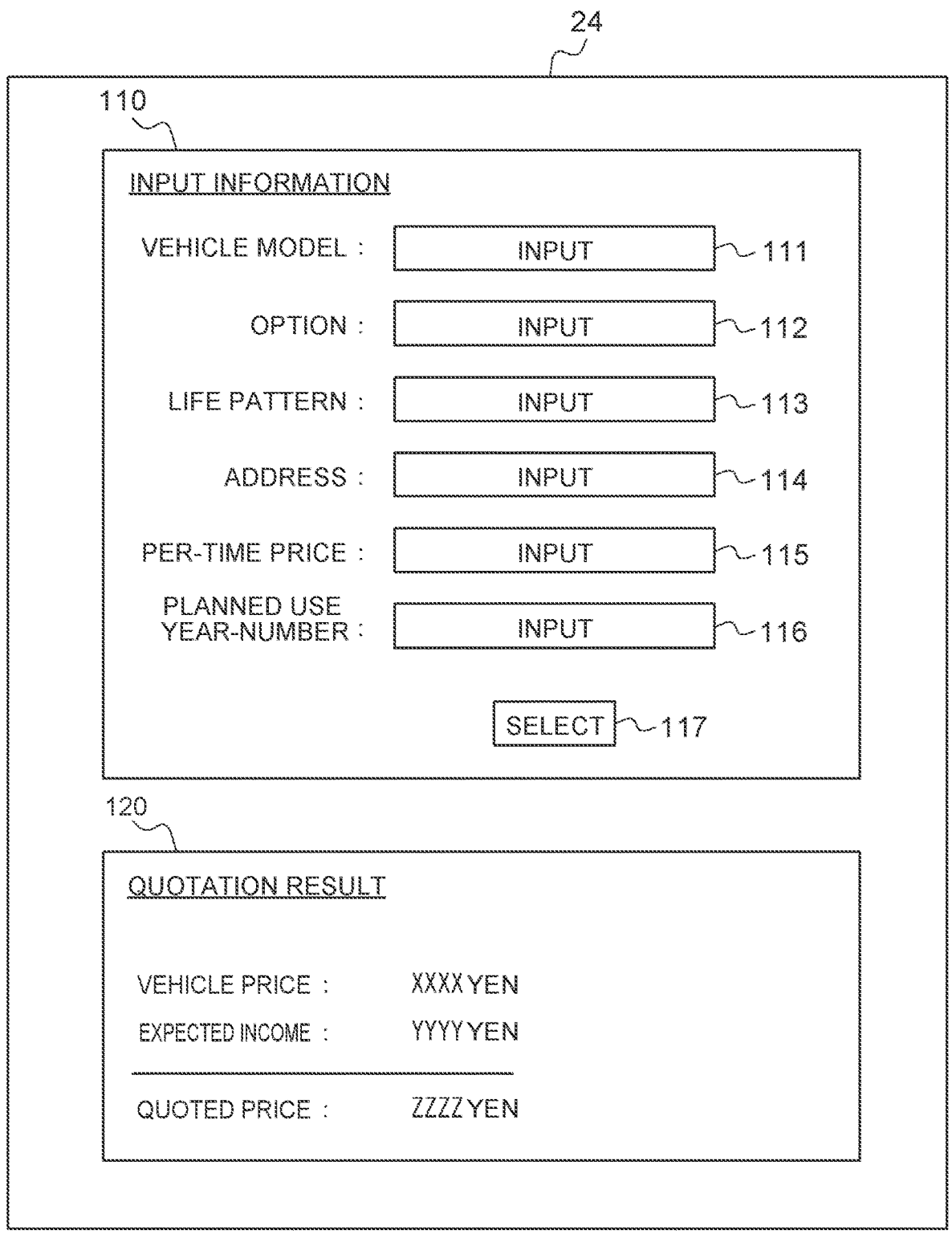
FIG. 4 is a diagram showing an example of a display on an output unit of the terminal device.

FIG. 4 shows an example of a display on the output unit 24 of the terminal device 20 when the input unit 23 accepts the input operation by the sales staff, the purchase contemplation person or the like. For the acceptance of the input operation shown in FIG. 4, the input unit 23 may be a touch screen, for example. The display shown in FIG. 4 is an example, and the disclosure is not limited to this display.

In the example shown in FIG. 4, a region 110 is a region for the acceptance of the input operation by the sales staff, the purchase contemplation person or the like. In the region 110, "input information" is displayed as a title, and the input of the vehicle model, the option, the life pattern, the address, the per-time price and the planned use year-number is accepted.

An input button 111 is a button for accepting the input of the "vehicle model". When the input button 111 is clicked, a pop-up window for accepting the input of the "vehicle model" may appear.

An input button 112 is a button for accepting the input of the "option". When the input button 112 is clicked, a pop-up window for accepting the input of the "option" may appear.

An input button 113 is a button for accepting the input of the "life pattern". When the input button 113 is clicked, a pop-up window for accepting the input of the "life pattern" may appear. The pop-up window for accepting the input of the "life pattern" may have a format for accepting the input of a day of week and a period of time during which the purchase contemplation person can lend the purchase contemplation vehicle, or may have a format for accepting the input of a day of week and a period of time during which the purchase contemplation person cannot lend the purchase contemplation vehicle.

An input button 114 is a button for accepting the input of the "address". When the input button 114 is clicked, a pop-up window for accepting the input of the "address" may appear.

An input button 115 is a button for accepting the input of the "per-time price". When the input button 115 is clicked, a pop-up window for accepting the input of the "per-time price" may appear.

An input button 116 is a button for accepting the input of the "planned use year-number". When the input button 116 is clicked, a pop-up window for accepting the input of the "planned use year-number" may appear.

When a select button 117 is clicked in a state where a variety of information relevant to the purchase contemplation vehicle and the purchase contemplation person, as exemplified by the vehicle model, the option, the life pattern, the address, the per-time price and the planned use year-number, has been input based on the input operation by the sales staff, the purchase contemplation person or the like, the control unit 25 of the terminal device 20 sends the variety of information relevant to the purchase contemplation vehicle and the purchase contemplation person to the information processing device 10 through the communication unit 21.

The communication unit 11 of the information processing device 10 receives the variety of information relevant to the purchase contemplation vehicle and the purchase contemplation person from the terminal device 20.

The control unit 15 of the information processing device 10 acquires the variety of information relevant to the purchase contemplation vehicle and the purchase contemplation person, through the communication unit 11, and calculates the demand forecast when the purchase contemplation person uses the purchase contemplation vehicle as the car-sharing vehicle.

The format of the demand forecast that is calculated by the control unit 15 may be an arbitrary format that allows the forecast of the demand when the purchase contemplation person uses the purchase contemplation vehicle as the car-sharing vehicle. For example, the format of the demand forecast may be a format in which the possibility that there is a consumer who hopes the car sharing of the purchase contemplation vehicle is expressed on a percentage basis for each period of time on each day of week.

The storage unit 12 of the information processing device 10 may store a database based on which the control unit 15 calculates the demand forecast. For example, the storage unit 12 may store, as the database, actual results of car-sharing use of vehicles previously sold at a dealer that sells the purchase contemplation vehicle. Alternatively, the storage unit 12 may store, as the database, actual results of car-sharing use previously sold not only at a dealer that sells the purchase contemplation vehicle but also at dealers in the same business group as the dealer. Alternatively, the storage unit 12 may store, as the database, actual results of car sharing in a business operator that provides a car sharing service.

The control unit 15 may calculate the demand forecast when the purchase contemplation person uses the purchase contemplation vehicle as the car-sharing vehicle, based on the variety of information that is relevant to the purchase contemplation vehicle and the purchase contemplation person and that is acquired from the terminal device 20, with reference to the database stored in the storage unit 12.

For example, the control unit 15 may calculate the demand forecast based on the life pattern of the purchase contemplation person. By calculating the demand forecast based on the life pattern of the purchase contemplation person in this way, the control unit 15 can calculate an accurate demand forecast for which a day of week and a period of time are considered.

For example, the control unit 15 may calculate the demand forecast based on a resident area of the purchase contemplation person. The resident area of the purchase contemplation person is an area that is associated with the address of the purchase contemplation person. The unit of the resident area may be a municipality such as a city, a town or a village, or may be a unique unit other than the municipality. By calculating the demand forecast based on the resident area of the purchase contemplation person in this way, the control unit 15 can calculate an accurate demand forecast for which the resident area is considered.

For example, the control unit 15 may calculate the demand forecast based on the vehicle model of the purchase contemplation vehicle. By calculating the demand forecast based on the vehicle model of the purchase contemplation vehicle in this way, the control unit 15 can calculate an accurate demand forecast for which the vehicle model is considered.

For example, the control unit 15 may calculate the demand forecast based on the per-time price when the purchase contemplation person lends the purchase contemplation vehicle as the car-sharing vehicle. Ordinarily, the demand decreases as the per-time price is higher, and the demand increases as the per-time price is lower. When the purchase contemplation person inputs the per-time price in a state where the pop-up window for accepting the input of the "per-time price" has appeared by the click of the input button 115 shown in FIG. 4, the purchase contemplation person, by inputting various per-time prices, can check expected incomes corresponding to the respective per-time prices. For increasing convenience for the user, the per-time price may be altered by a slider bar, on the pop-up window for accepting the input of the "per-time price". As the per-time price, per-time prices that are different on an annual basis may be input. For example, the purchase contemplation person may set the per-time price to a high price immediately after the purchase of the vehicle, and may decrease the per-time price as time passes. By calculating the demand forecast based on the per-time price in this way, the control unit 15 can calculate an accurate demand forecast for which the per-time price is considered.

For example, the control unit 15 may calculate the demand forecast based on the option that is equipped in the purchase contemplation vehicle. Examples of the option include an automatic driving function. When the automatic driving function is added to the purchase contemplation vehicle as the option, the vehicle price increases, but increase in estimated income is assumed because of increase in demand and increase in per-time price in the use for the car sharing. As a result, there is a possibility that the addition of the automatic driving function as the option causes decrease in quoted price. By inputting various options and calculating quoted prices, the purchase contemplation person can easily check the quoted prices depending on the options. By calculating the demand forecast based on the option in this way, the control unit 15 can calculate an accurate demand forecast for which the option is considered.

In the calculation of the demand, the control unit 15 may calculate the demand forecast based on a combination of the life pattern, the resident area, the vehicle model, the per-time price and the option described above. The control unit 15 may calculate the demand forecast based on at least one of the life pattern, the resident area, the vehicle model, the per-time price and the option.

The control unit 15 may calculate the demand forecast in consideration of aging degradation of the purchase contemplation vehicle. For example, the control unit 15 may calculate the demand forecast, assuming that the demand decrease as time passes after the purchase of the purchase contemplation vehicle, even under the same condition.

The control unit 15 calculates the expected income when the purchase contemplation person uses the purchase contemplation vehicle as the car-sharing vehicle, based on the calculated demand forecast. For example, the control unit 15 may calculate the expected income when the purchase contemplation person uses the purchase contemplation vehicle as the car-sharing vehicle, based on the calculated demand forecast and the per-time price when the purchase contemplation person lends the purchase contemplation vehicle as the car-sharing vehicle.

The control unit 15 calculates the quoted price by subtracting the expected income from the vehicle price of the purchase contemplation vehicle. The vehicle price of the purchase contemplation vehicle may include costs such as legal costs and agency costs, in addition to the price of the vehicle itself.

The control unit 15 sends quotation information including the calculated quoted price, to the terminal device 20 through the communication unit 11. For example, the quotation information may include the vehicle price, the expected income and the like, in addition to the quoted price.

The communication unit 21 of the terminal device 20 receives the quotation information from the information processing device 10. The control unit 25 acquires the quotation information through the communication unit 21, and displays the quotation information to the output unit 24.

FIG. 4 shows an example of a display on the output unit 24 when the control unit 25 displays the quotation information on the output unit 24.

In the example shown in FIG. 4, a region 120 is a region for displaying the quotation information. In the region 120, "quotation result" is displayed as a title, and the vehicle price, the expected income and the quoted price are displayed. The quotation information displayed in the region 120 is obtained from the result calculated by the information processing device 10 based on the information input to the region 110.

Consideration of Sale Price

In the calculation of the quoted price, in addition to the subtraction of the expected income from the vehicle price of the purchase contemplation vehicle, the control unit 15 of the information processing device 10 may subtract, from the vehicle price, a predicted sale price that is predicted when the purchase contemplation vehicle is sold at the time of the elapse of the planned use year-number, together with the expected income. Thereby, the information processing device 10 can calculate a further lower quoted price as the quoted price of the purchase contemplation vehicle, and can further increase the buying motivation of the purchase contemplation person.

Presentation of Different Candidate

When the control unit 15 of the information processing device 10 calculates the quoted price of the purchase contemplation vehicle, the control unit 15 of the information processing device 10 may calculate the quoted prices of different vehicle models other than the purchase contemplation vehicle, based on the variety of information about the purchase contemplation person, and other information, and may extract information about a different vehicle model that is comparable in quoted price to the purchase contemplation vehicle. The control unit 15 sends, to the terminal device 20, the quotation information about the different vehicle model that is comparable in quoted price to the purchase contemplation vehicle, together with the quotation information about the purchase contemplation vehicle. The control unit 15 may send a plurality of pieces of quotation information about different vehicle models.

When the terminal device 20 receives the quotation information about the different vehicle model that is comparable in quoted price to the purchase contemplation vehicle together with the quotation information about the purchase contemplation vehicle, the terminal device 20 may display the quotation information about the different vehicle model on the output unit 24 together with the quotation information about the purchase contemplation vehicle.

In the case where the terminal device 20 presents the quotation information about the different vehicle model on the output unit 24 of the terminal device 20 together with the quotation information about the purchase contemplation vehicle in this way, there is a possibility that the purchase contemplation person has a buying motivation for the different vehicle model, for which the purchase is not originally contemplated.

Behaviors of the information processing system 1 will be described with reference to flowcharts shown in FIG. 5 and FIG. 6. FIG. 5 is a flowchart mainly showing a behavior of the terminal device 20. FIG. 6 is a flowchart mainly showing a behavior of the information processing device 10.

In step S101 of FIG. 5, the input unit 23 of the terminal device 20 acquires the variety of information relevant to the purchase contemplation vehicle and the purchase contemplation person, based on the input operation by the sales staff, the purchase contemplation person or the like.

In step S102 of FIG. 5, the control unit 25 of the terminal device 20 sends the variety of information that is relevant to the purchase contemplation vehicle and the purchase contemplation person and that is acquired by the input unit 23, to the information processing device 10 through the communication unit 21.

In step S201 of FIG. 6, the communication unit 11 of the information processing device 10 receives the variety of information that is relevant to the purchase contemplation vehicle and the purchase contemplation person and that is sent by the terminal device 20 in step S102.

In step S202 of FIG. 6, the control unit 15 of the information processing device 10 calculates the demand forecast when the purchase contemplation person uses the purchase contemplation vehicle as the car-sharing vehicle, based on the variety of information that is relevant to the purchase contemplation vehicle and the purchase contemplation person and that is acquired through the communication unit 11.

In step S203 of FIG. 6, the control unit 15 of the information processing device 10 calculates the expected income when the purchase contemplation person uses the purchase contemplation vehicle as the car-sharing vehicle, based on the calculated demand forecast.

In step S204 of FIG. 6, the control unit 15 of the information processing device 10 calculates the quoted price by subtracting the calculated expected income from the vehicle price of the purchase contemplation vehicle.

In step S205 of FIG. 6, the control unit 15 of the information processing device 10 sends the quotation information including the calculated quoted price, to the terminal device 20 through the communication unit 11.

In step S103 of FIG. 5, the communication unit 21 of the terminal device 20 receives the quotation information sent by the information processing device 10 in step S205.

In step S104 of FIG. 5, the control unit 25 of the terminal device 20 displays the quotation information acquired through the communication unit 21, on the output unit 24.

As described above, in the information processing device 10 according to the embodiment, the control unit 15 calculates the demand forecast when the purchase contemplation person uses the purchase contemplation vehicle as the car-sharing vehicle. The control unit 15 calculates the expected income when the purchase contemplation person uses the purchase contemplation vehicle as the car-sharing vehicle, based on the calculated demand forecast. The control unit 15 calculates the quoted price by subtracting the calculated expected income from the vehicle price of the purchase contemplation vehicle. In this way, the information processing device 10 according to the embodiment calculates the demand forecast when the purchase contemplation person uses the purchase contemplation vehicle as the car-sharing vehicle, and then calculates the expected income based on the calculated demand forecast. Accordingly, the information processing device 10 according to the embodiment can present such a quoted price that the purchase price of the vehicle is ostensibly low, based on an accurate forecast.

The disclosure is not limited to the above-described embodiment. For example, a plurality of blocks described in the block diagrams may be integrated, or one block may be divided. Instead of executing a plurality of steps described in the flowcharts in a time-series order in accordance with the description, it is allowable to execute the steps in parallel or in a different order, depending on the processing powers of the devices that execute the steps, or as necessary. In addition, modifications can be made without departing from the spirit of the disclosure.

For example, some of the processes that are executed in the information processing device 10 in the above-described embodiment may be executed in the terminal device 20. At least some of the processes that are executed in the terminal device 20 may be executed in the information processing device 10.

For example, a general-purpose electronic device such as a computer may function as the information processing device 10 according to the above-described embodiment. Specifically, a program in which processing details for realizing the functions of the information processing device 10 and the like according to the embodiment are described may be stored in a memory of the electronic device, and the program may be read and executed by a processor of the electronic device. Accordingly, an embodiment of the disclosure can be realized as a program that can be executed by a processor.

For example, in the above-described embodiment, the database based on which the control unit 15 calculates the demand forecast is stored in the storage unit 12 of the information processing device 10, but the database may be stored in a device other than the storage unit 12. For example, the database may be stored in a storage device that is installed separately from the information processing device 10.

What is claimed is:

1. A system for predicting and comparing effective prices of vehicles, for presentation to a purchase contemplation person selecting a vehicle for contemplation, the vehicle pricing system comprising a control unit that:
    for the vehicle selected for contemplation and for each vehicle of a plurality of alternative vehicles:
        calculates a demand forecast describing a predicted level of demand for the vehicle for car-sharing purposes, the demand forecast being calculated based on data provided by the purchase contemplation person,
        calculates an expected income for when the purchase contemplation person uses the vehicle for car-sharing purposes, based on the demand forecast, and
        calculates the effective price based on a deduction of the expected income from a vehicle price of the vehicle;
    identifies, from the plurality of alternative vehicles, an alternative vehicle having an effective price comparable to the effective price of the vehicle selected for contemplation;
    extracts model information of the identified alternative vehicle; and
    provides the effective prices of the vehicle selected for contemplation and the identified alternative vehicle, and the extracted model information of the identified alternative vehicle, for presentation to the purchase contemplation person.

2. The system according to claim 1, wherein the control unit calculates the demand forecast based on demand during expected periods of availability of the vehicle for car-sharing purposes.

3. The system according to claim 1, wherein the control unit calculates the demand forecast based on demand within a resident area of the purchase contemplation person.

4. The system according to claim 1, wherein the control unit calculates the demand forecast based on a vehicle model of the vehicle.

5. The system according to claim 1, wherein the control unit calculates the demand forecast based on a per-time price when the purchase contemplation person uses the vehicle for car-sharing purposes, the demand forecast being inversely related to the per-time price.

6. The system according to claim 1, wherein the control unit calculates the demand forecast based on an option that is equipped in the vehicle, the demand forecast increasing with the presence of the option.

7. The system according to claim 1, wherein the control unit calculates the demand forecast in consideration of aging degradation of the vehicle, the demand forecast being inversely related to the passage of time.

8. The predictive vehicle pricing system according to claim 1, wherein the demand forecast describes a predicted level of demand for the vehicle over an expected ownership duration of the vehicle.

9. A computer program product that predicts and compares effective prices of vehicles, for presentation to a purchase contemplation person selecting a vehicle for contemplation, the computer program product comprising a non-transient computer-readable storage device storing instructions, wherein the instructions, when executed by a processor of a computing device, configure the computing device to:
    for the vehicle selected for contemplation and for each vehicle of a plurality of alternative vehicles:
        calculating a demand forecast describing a predicted level of demand for the vehicle for car-sharing purposes, the demand forecast being calculated based on data provided by the purchase contemplation person,
        calculating an expected income for when the purchase contemplation person uses the vehicle for car-sharing purposes, based on the demand forecast, and
        calculating the effective price based on a deduction of the expected income from a vehicle price of the vehicle;

identifying, from the plurality of alternative vehicles, an alternative vehicle having an effective price comparable to the effective price of the vehicle selected for contemplation;

extracting model information of the identified alternative vehicle; and providing the effective prices of the vehicle selected for contemplation and the identified alternative vehicle, and the extracted model information of the identified alternative vehicle, for presentation to the purchase contemplation person.

10. The computer program product according to claim 9, wherein the calculating the demand forecast includes calculating the demand forecast based on demand during expected periods of availability of the vehicle for car-sharing purposes.

11. The computer program product according to claim 9, wherein the calculating the demand forecast includes calculating the demand forecast based on demand within a resident area of the purchase contemplation person.

12. The computer program product according to claim 9, wherein the calculating the demand forecast includes calculating the demand forecast based on a vehicle model of the vehicle.

13. The computer program product according to claim 9, wherein the calculating the demand forecast includes calculating the demand forecast based on a per-time price when the purchase contemplation person uses the vehicle for car-sharing purposes, the demand forecast being inversely related to the per-time price.

14. The computer program product according to claim 9, wherein the calculating the demand forecast includes calculating the demand forecast based on an option that is equipped in the vehicle, the demand forecast increasing with the presence of the option.

15. A method for predicting and comparing effective prices of vehicles, for presentation to a purchase contemplation person selecting a vehicle for contemplation, the method comprising:

for the vehicle selected for contemplation and for each vehicle of a plurality of alternative vehicles:

calculating a demand forecast describing a predicted level of demand for the vehicle for car-sharing purposes, the demand forecast being calculated based on data provided by the purchase contemplation person, calculating an expected income for when the purchase contemplation person uses the vehicle for car-sharing purposes, based on the demand forecast, and calculating the effective price based on a deduction of the expected income from a vehicle price of the vehicle;

identifying, from the plurality of alternative vehicles, an alternative vehicle having an effective price comparable to the effective price of the vehicle selected for contemplation;

extracting model information of the identified alternative vehicle; and providing the effective prices of the vehicle selected for contemplation and the identified alternative vehicle, and the extracted model information of the identified alternative vehicle, for presentation to the purchase contemplation person.

16. The method according to claim 15, wherein the calculating the demand forecast includes calculating the demand forecast based on demand during expected periods of availability of the vehicle for car-sharing purposes.

17. The method according to claim 15, wherein the calculating the demand forecast includes calculating the demand forecast based on demand within a resident area of the purchase contemplation person.

18. The method according to claim 15, wherein the calculating the demand forecast includes calculating the demand forecast based on a vehicle model of the vehicle.

19. The method according to claim 15, wherein the calculating the demand forecast includes calculating the demand forecast based on a per-time price when the purchase contemplation person uses the vehicle for car-sharing purposes, the demand forecast being inversely related to the per-time price.

20. The method according to claim 15, wherein the calculating the demand forecast includes calculating the demand forecast based on an option that is equipped in the vehicle, the demand forecast increasing with the presence of the option.

* * * * *